(12) United States Patent
Dijkstra et al.

(10) Patent No.: US 6,534,585 B1
(45) Date of Patent: Mar. 18, 2003

(54) UV STABLE POLYETHERESTER COPOLYMER COMPOSITION AND FILM THEREFROM

(75) Inventors: Krijn Dijkstra, Sittard (NL); Pieter Gijsman, Groot-Genhout (NL)

(73) Assignee: DSM N.V., Heerlen (NL)

( * ) Notice: Subject to any disclaimer, the term of this patent is extended or adjusted under 35 U.S.C. 154(b) by 106 days.

(21) Appl. No.: 09/722,416

(22) Filed: Nov. 28, 2000

Related U.S. Application Data

(63) Continuation of application No. PCT/NL99/00331, filed on May 27, 1999.

(30) Foreign Application Priority Data

May 29, 1999 (NL) .............................................. 1009288

(51) Int. Cl.[7] .............................. C08J 3/00; C08K 5/34; C08K 3/04; C08L 67/00; B05D 3/02
(52) U.S. Cl. ................. 524/495; 427/372.2; 427/385.5; 428/480; 524/86; 524/496
(58) Field of Search ................................. 524/495, 496, 524/86; 427/372.2, 385.5; 428/480

(56) References Cited

U.S. PATENT DOCUMENTS

| | | | |
|---|---|---|---|
| 3,778,387 A | * 12/1973 | Urbanic et al. | |
| 4,391,943 A | 7/1983 | Scheetz | |
| 4,524,165 A | 6/1985 | Musser et al. | |
| 4,699,942 A | 10/1987 | Weaver et al. | |
| 5,859,083 A | 1/1999 | Spijkers et al. | |

FOREIGN PATENT DOCUMENTS

| | | |
|---|---|---|
| EP | 783016 A2 * | 7/1997 |
| EP | 0885924 A2 | 12/1998 |
| WO | WO96/28503 | 9/1997 |
| WO | WO98/39503 | 9/1998 |

* cited by examiner

Primary Examiner—Patrick D. Niland
(74) Attorney, Agent, or Firm—Pillsbury Winthrop LLP

(57) ABSTRACT

A polyetherester copolymer composition having improved UV stability includes activated carbon and hindered amine light stabilizer (HALS). A film of the composition having a thickness of 100 μm increases life by a factor of about 2, relative to the sum of the individual components.

15 Claims, No Drawings

UV STABLE POLYETHERESTER COPOLYMER COMPOSITION AND FILM THEREFROM

This is a continuation of PCT/NL99/00331, filed May 27, 1999.

The invention relates to elastomer copolyetherester film having improved resistance to ageing under the influence of UV light. Elastomer copolyetherester film is increasingly being used as a moisture regulating top layer in roof coverings and other building applications. During the building phase the film is often exposed to direct sunlight for a longer period of time before the roof tiles are placed. Especially in mountainous regions the irradiation by UV light can be very intensive. UV irradiation causes the mechanical properties of the unprotected film to deteriorate very rapidly, and as a result the film may very easily be damaged, for example by falling tools. In more extreme cases it is no longer possible to tread on the roof covering without damaging it. In addition, the moisture regulating properties are adversely affected.

From Encyclopaedia of Polymer Science and Engineering Vol. 12, p. 102 (1988), John Wiley and Sons, Inc., it is known that copolyetheresters can effectively be protected against UV light in outdoor applications by the addition of 0.5–3 wt. % activated carbon. Vol. 15, pp. 563–564 (1989) of the same Encyclopaedia further discloses that good dispersion of the activated carbon is essential and the particle size should be between 15 and 25 nm. The claims of EP-0783016-A2 again repeat these findings, on account of which copolyetherester film would have a good UV stability and improved IR remission. The present inventors, however, have not been able to find any experimental basis in EP-0783016-A2 for said advantages or for any special effect. On the contrary, the UV resistance of carbon black containing copolyetherester film, in particular of the membranes disclosed in claim 14 of said patent, with a thickness of 5–30 μm, proves to differ only slightly from that of non-stabilized membranes.

The UV-stabilized copolyetherester films according to the state of the art appear to be wholly incapable of meeting the rigid conditions that are imposed on films in particular in the building world.

The aim of the invention is therefore a copolyetherester composition which, also when used in very thin film, has a considerably improved resistance to UV irradiation so as to enable application inter alia as a moisture regulating top layer in roof covering.

The inventors have achieved this aim with a copolyetherester composition containing a stabilizer combination of 0.1–10 wt. % activated carbon and 0.1–3 wt. % of a hindered amine light stabilizer (HALS). The use of HALS in a copolyetherester composition to improve the stability has been known for a long time, its use being disclosed inter alia in JP-52-044869-A. To improve its activity, it is known to apply combinations of HALS with other UW stabilizers. JP-60-015455-A, U.S. Pat. No. 4,524,165-A and JP-02-283754 describe the combination with a triazole and JP-04-337.349-A the combination with a thio-ether. The inventors have tested these combinations and some other combinations of UV stabilizers, but none of these yielded enough stability for the use in film.

It is highly surprising that the combination with activated carbon, conversely, yields a very substantial improvement of the resistance to UV radiation, to such an extent that even very thin polyetherester film can be exposed to direct UV light for a longer period of time.

The copolyetheresters of the composition comprise copolyetheresters derived from polyether glycols with an average molecular weight of 600–6000, glycols, preferably alkylene glycols, for example ethylene or butylene glycol, and dicarboxylic acids, for example aromatic dicarboxylic acids, preferably terephthalic acid and naphthalenic dicarboxylic acid, cycloaliphatic dicarboxylic acids, for example cyclohexane dicarboxylic acid and aliphatic dicarboxylic acids, for example adipic acid.

Examples and preparation of such copolyetheresters are described in, inter alia, Thermoplastic Elastomers, 2nd Ed., Chapter 8, Carl Hanser Verlag (1996) ISBN 1-56990-205-4, Handbook of Thermoplastics, ed. O. Otabisi, Chapter 17, Marcel Dekker Inc., New York 1997, ISBN 0-8247-9797-3 and the Encyclopaedia of Polymer Science and Engineering, Vol. 12, pp. 75–117 and the references cited therein. A large number of copolyetheresters are commercially available.

The ratio between the polyester units derived from the polyether glycol and those derived from the alkylene glycol, i.e. the ratio between the soft and hard segments of the copolyetherester may vary within a broad range and is determined mainly by the application of the polyetherester copolymer. In general this ratio will be chosen so that the Shore D hardness of the polymer is between 25 and 80.

The moisture-regulating capacity of the membranes obtained from the polyetherester copolymer is varied as needed through variation of the thickness of the membrane or by varying the C:O ratio in the polyalkylene oxide glycols in the polyetherester copolymer. In general the ratio is between 2 and 4.3, a low ratio generally leading to an increase in the water vapour permeability.

Activated carbon is in this context understood to be a specific form of carbon consisting of very fine primary particles combined into primary aggregates, which are not broken under normal dispersing conditions. These primary aggregates in turn generally combine in the form of agglomerates. Characteristic of this activated carbon is the large surface area that is optically available. This surface area is determined mainly by the size of the primary particles and their degree of packing in the primary aggregates. Activated carbon can be obtained in different manners and is commercially available in different forms and under various tradenames. Preferably, carbon black is used. It is preferred that under the conditions of preparation of the composition all agglomerates are broken down into primary aggregates, which should form a fine dispersion in the composition. The diameter of the primary particles may vary within a broad range, for example between 10 and 100 nm. Preferably, the average particle size is chosen to be between about 15 and 40 nm. When the particles are smaller, the radiation absorbing capacity decreases strongly as the radiation can bend around the particle. When the particles are bigger, the optically available surface area decreases too strongly, and the diameter of the primary aggregates may sometimes be too large as a result of which processing into thin films presents problems.

The activated carbon content of the composition may in principle vary within a broad range, for example between 0.1 and 10 wt. %. Preferably, the content is limited to between 0.5 and 5 wt. %, even more preferably between 0.5 and 3 wt. %, as lower concentrations have relatively little effect and at concentrations in excess of 3 wt. % only little more UV radiation is absorbed. The useful upper limit is A generally the content at which the surface layer of the composition just ceases to be transparent. For very thin film, therefore, a higher carbon content is desirable than for thicker film. Higher carbon contents, incidentally, generally have an adverse effect on the mechanical properties, such as elongation at break.

The hindered amine light stabilizer (HALS) of the composition according to the invention is a UV light stabilizer for copolyetherester compositions that in itself is often used by ones skilled in the art. Very well-known in the professional world is the HALS disclosed in the European patent EP-000389-B1, bis-(1,2,2,6,6-penta-methyl-piperidyl)-(3', 5'-di-tert-butyl-4'hydroxy-benzyl)-butyl-malonate, available under the tradename Tinuvin® 144 from Ciba-Geigy.

A hindered amine light stabilizer is understood to mean compounds of the following general formulas:

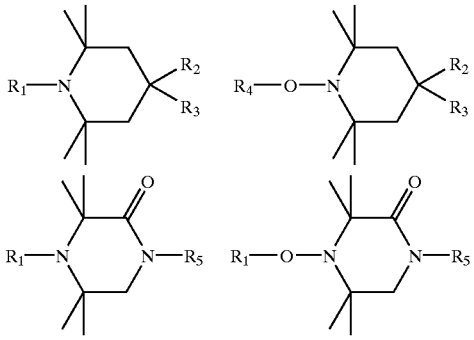

and combinations thereof.

In these formulas, $R_1$ up to and including $R_5$ are independent substituents. Examples of suitable substituents are hydrogen, ether groups, ester groups, amine groups, amide groups, alkyl groups, alkenyl groups, alkynyl groups, aralkyl groups, cycloalkyl groups and aryl groups, in which the substituents in turn may contain functional groups; examples of functional groups are alcohols, ketones, anhydrides, imines, siloxanes, ethers, carboxyl groups, aldehydes, esters, amides, imides, amines, nitriles, ethers, urethanes and any combination thereof. A hindered amine light stabilizer may also form part of a polymer.

Preferably, as HALS compound a compound is chosen that is derived from a substituted piperidine compound, in particular any compound derived from an alkyl-substituted piperidyl, piperidinyl or piperazinone compound, and substituted alkoxypiperidinyl compounds. Examples of such compounds are:

2,2,6,6-tetramethyl-4-piperidone;
2,2,6,6-tetrametyl-4-piperidinol;
bis-(1,2,2,6,6-pentamethyl piperidyl)-(3',5'-di-tert-butyl-4'-hydroxybenzyl)-butylmalonate;
di-(2,2,6,6-tetramethyl-4-piperidyl)-sebacate (Tinuvin® 770);
oligomer of N-(2-hydroxyethyl)-2,2,6,6-tetramethyl-4-piperidinol and succinic acid (Tinuvin® 622);
oligomer of cyanuric acid and N,N-di(2,2,6,6-tetramethyl-4-piperidyl)-hexamethylene diamine;
bis-(2,2,6,6-tetramethyl-4-piperidinyl)-succinate;
bis-(1-octyloxy-2,2,6,6-tetramethyl-4-piperidinyl)-sebacate (Tinuvin® 123);
bis-(1,2,2,6,6-pentamethyl-4-piperidinyl)-sebacate (Tinuvin® 765);
tetrakis-(2,2,6,6-tetramethyl-4-piperidyl)-1,2,3,4-butane-tetracarboxylate;
N,N'-bis-(2,2,6,6-tetramethyl-4-piperidyl)-hexane-1,6-diamine (Chimasorb® T5);
N-butyl-2,2,6,6-tetramethyl-4-piperidinamine;
2,2'-[(2,2,6,6-tetramethyl-piperidinyl)-imino]-bis-[ethanol];
poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346);
5-(2,2,6,6-tetramethyl-4-piperidinyl)-2-cyclo-undecyl-oxazole) (Hostavin® N20);
1,1'-(1,2-ethane-di-yl)-bis-(3,3',5,5'-tetramethyl-piperazinone);
8-acetyl-3-dothecyl-7,7,9,9-tetramethyl-1,3,8-triazaspiro(4,5)decane-2,4-dione;
polymethylpropyl-3-oxy-[4(2,2,6,6-tetramethyl)-piperidinyl)-siloxane (Uvasil® 299);
1,2,3,4-butane-tetracarboxylic acid-1,2,3-tris(1,2,2,6,6-pentamethyl-4-piperidinyl)-4-tridecylester;
copolymer of alpha-methylstyrene-N-(2,2,6,6-tetramethyl-4-piperidinyl)maleimide and N-stearyl maleimide;
1,2,3,4-butanetetracarboxylic acid, polymer with beta,beta, beta1,beta1-tetramethyl-2,4,8,10-tetraoxaspiro[5.5]undecane-3,9-diethanol, 1,2,2,6,6-pentamethyl-4-piperidinyl ester (Mark® LA63);
2,4,8,10-tetraoxaspiro[5.5]undecane-3,9-diethanol,beta, beta,beta',beta'-tetramethyl-polymer with 1,2,3,4-butanetetracarboxylic acid, 2,2,6,6-tetramethyl-4-piperidinyl ester (Mark® LA68);
D-glucitol, 1,3:2,4-bis-O-(2,2,6,6-tetramethyl-4-piperidinylidene)-(HALS 7);
oligomer of 7-oxa-3,20-diazadispiro[5.1.11.2]-heneicosan-21-one,2,2,4,4-tetramethyl-20-(oxiranylmethyl)-(Hostavin® N30);
propanedioic acid, [(4-methoxyphenyl)methylene]-,bis(1,2,2,6,6-pentamethyl-4-piperidinyl) ester (Sanduvor® PR 31);
formamide, N,N'-1,6-hexanediylbis[N-(2,2,6,6-tetramethyl-4-piperidinyl (Uvinul® 4050H).
1,3,5-triazine-2,4,6-triamine, N,N'''-[1,2-ethanediylbis [[[4,6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl) (Chimassorb® 119);
1,5-dioxaspiro (5,5) undecane 3,3-dicarboxylic acid, bis(2,2,6,6-tetramethyl-4-peridinyl) ester (Cyasorb® UV-500)
1,5-dioxaspiro (5,5) undecane 3,3-dicarboxylic acid, bis (1,2,2,6,6-pentamethyl-4-peridinyl) ester (Cyasorb® UV-516);
N-2,2,6,6-tetramethyl-4-piperidinyl-N-amino-oxamide;
4-acryloyloxy-1,2,2,6,6-pentamethyl-4-piperidine.
1,5,8,12-tetrakis[2',4'-bis(1",2",2",6",6"-pentamethyl-4"-piperidinyl(butyl)amino)-1',3',5'-triazine-6'-yl]-1,5,8,12-tetraazadodecane.

HALS PB-41 (Clariant Huningue S. A.)
Nylostab® S-EED (Clariant Huningue S. A.)
3-dodecyl-1-(2,2,6,6-tetramethyl-4-piperidyl)-pyrrolidin-2,5-dione
Uvasorb® HA88
1,1'-(1,2-ethane-di-yl)-bis-(3,3',5,5'-tetra-methyl-piperazinone) (Good-rite® 3034)
1,1'1"-(1,3,5-triazine-2,4,6-triyltris ((cyclohexylimino)-2,1-ethanediyl)tris(3,3,5,5-tetramethylpiperazinone); (Good-rite® 3150)
1,1',1"-(1,3,5-triazine-2,4,6-triyltris((cyclohexylimino)-2,1-ethanediyl)tris(3,3,4,5,5-tetramethylpiperazinone) (Good-rite® 3159)

Preferably, use is made of the oligomer of N-(2-hydroxyethyl)-2,2,6,6-tetramethyl-4-piperidinol and succinic acid (Tinuvin® 622); poly((6-morpholine-S-triazine-2,4-diyl) (2,2,6,6-tetramethyl-4-piperidinyl)-iminohexamethylene-(2,2,6,6-tetramethyl-4-piperidinyl)- imino) (Cyasorb® UV 3346); polymethylpropyl-3-oxy-[4 (2,2,6,6-tetramethyl)-piperidinyl)-siloxane (Uvasil® 299); oligomer of 7-oxa-3,20-diazadispiro[5.1.11.2]heneicosan-21-one,2,2,4,4-tetramethyl-20-(oxiranylmethyl)- (Hostavin® N30); propanedioic acid, [(4-methoxyphenyl) methylene]-,bis(1,2,2,6,6-pentamethyl-4-piperidinyl) ester (Sanduvor® PR 31); 1,3,5-triazine-2,4,6-triamine, N,N'''-[1, 2-ethanediylbis[[[4,6-bis[butyl(1,2,2,6,6-pentamethyl-4-iperidinyl)amino]-1,3,5-triazine-2-yl]imino]-3,1-propanediyl]]-bis[N',N'''-dibutyl-N',N''-bis(1,2,2,6,6-pentamethyl-4-piperidinyl) (Chimassorb® 119); HALS PB-41 (Clariant Huningue S. A.); Uvasorb® HA88; 1,1',1''-(1,3,5-triazine-2,4,6-triyltris ((cyclohexylimino)-2,1-ethanediyl)tris(3,3,5,5-tetramethylpiperazinone), (Good-rite® 3150); 1,1',1''-(1,3,5-triazine-2,4,6-triyltris ((cyclohexylimino)-2,1-ethanediyl)tris(3,3,4,5,5-tetramethylpiperazinone) (Good-rite® 3159).

In principle, the HALS content of the composition may vary within a broad range, for example between 0.05 and 3 wt. %, preferably between 0.1 and 2 wt. %, even more preferably between 0.2 and 1 wt. %. When HALS without activated carbon is used, the upper limit of the amount of to be used is determined to an important extent by the HALS bleeding effect, but it has, very surprisingly, been found that this effect is less prominent in the presence of activated carbon. Preferably, high-molecular HALS is used in polyetherester film, for example Tinuvin® 622, Uvasil® 299, Cyasorb® UV 3346 and Chimassorb® 944, which are oligomeric or polymeric HALS compounds and have a molecular weight>1500, preferably>2000.

In practice, therefore, the HALS content of the composition according to the invention is determined predominantly by the concentration needed for achieving the desired life. This content generally lies between 0.1 and 1.0 wt. %.

The composition may optionally comprise other additives, for example fillers, thermooxidative stabilizers, further supplementary light stabilizers, for example triazoles or thioesters, processing aids, colourants, etc.

The composition can be obtained in a manner known to the average one skilled in the art, who will pay attention in particular to a good dispersion of the activated carbon and HALS in the composition, preferably using the "masterbatch" method, in which preferably a concentrate of the activated carbon (for example 10–40 wt. %) in the polyether ester or a compatible polymer is produced on a twin-screw extruder, which is then incorporated as required in the melt in the polyetherester copolymer. For this, too, preferably a twin-screw extruder is used. The HALS is also preferably added in the form of a masterbatch.

It is, for that matter, also possible to incorporate the constituent components into the melt in any other way, in doing which special attention should be paid to obtaining a good dispersion, inter alia through almost complete disintegration of the carbon agglomerates in the primary aggregates, by means of inter alia high shear forces or the use of dispersants.

The invention will now be elucidated on the basis of the following examples and comparative experiments. The examples are limited to one type of copolyetherester and a specific combination of carbon black and HALS. However, it will be evident that, as the mechanism of the degradation of the copolyetherester affects the ether groups of the copolyether, any other copolyetherester could have been used as a model and the activity of the activated carbon resides in its large specific optical surface area and the activity of the HALS is determined mainly by the presence of the group outlined in the formulas, any other activated carbon types and other HALS will lead to a comparable result.

Materials Used

Arnitel® EM 400: a copolyetherester with polybutylene terephthalate as hard segment and tetramethylene oxide as soft segment, Shore D=40, from DSM, The Netherlands.

Activated carbon: (CB) Black Pearls 880 masterbatch, in PE as carrier, from Cabot, average particle size 16 nm.

HALS: Chimasorb® 944, an oligomer of cyanuric acid and N,N-Di(2,2,6,6-tetramethyl-4-piperidyl)-hexamethylene-diamine from Ciba-Geigy, Switzerland.

Experimental

The compositions given in Tables 1 and 2 were obtained by blending the Arnitel® EM400, the activated carbon and the HALS on a Werner & Pfleider 30 mm twin-screw extruder at a temperature setting of 245° C., a speed of 250 rpm and a throughput of 10 kg/hour. All raw materials were fed to the throat. The granules were processed into a film by means of a Battenfeld 45 mm single-screw extruder, equipped with a Verbruggen 250 mm wide film head. The temperature setting was 220° C. and the lip was set at 0.3 mm. Variation in the film thickness was obtained through variation of the take-off rate.

Ageing

Ageing was effected by exposing film samples in an Atlas WOM Ci 65A (weather-o-meter) apparatus equipped with Xenon light source under the following conditions:

| Filters | |
|---|---|
| internal | borosilicate "S" |
| external | borosilicate "S" |
| Intensity | 0.35 W/m²/nm at 340 nm |
| Temperature: | |
| Black standard | 67° C. |
| Black panel | 73° C. |
| Area | 45° C. |
| Relative humidity | 50 ± 10% |
| Dry/wet cycle | 102/18 minutes |

At regular intervals samples were taken and subjected to mechanical tests.

Mechanical Testing

The elongation at break of the films was determined on a Zwick 1445 tensile tester according to ASTM G 26. Test bar dimensions according to DIN 53504S3, prismatic part, length: 12 mm, width: 2 mm.

Composition and Results

The life of the samples was characterized as the period after which the elongation at break has decreased to a value below 100%.

TABLE 1

Film thickness 100 μm

| Experiment | 1 | 2 | 3 | 4 | 5* | 6* |
|---|---|---|---|---|---|---|
| HALS, wt. % | 0 | 1 | 0 | 0 | 1 | 0.5 |
| CB, wt. % | 0 | 0 | 1 | 2 | 2 | 1 |
| life [hours] | 24 | 200 | 150 | 600 | 7000 | 2000 |

Film thickness 175 μm

| Experiment | 7 | 8 | 9* | 10* |
|---|---|---|---|---|
| HALS, wt. % | 0.5 | 0 | 1 | 0.5 |
| CB, wt. % | 0 | 1 | 1 | 2 |
| life [hours] | 168 | 150 | >7000 | >7000 |

TABLE 1-continued

Film thickness 25 μm

| Experiment | 11 | 12 | 13* | 14* | 15 |
|---|---|---|---|---|---|
| HALS, wt. % | 0 | 0.5 | 1 | 0.5 | 0 |
| CB, wt. % | 1 | 0 | 1 | 2 | 0 |
| life [hours] | 20 | 48 | 168 | 150 | 10 |

*Examples according to the invention.

The above table shows, as is to be expected, that the life of very thin film is substantially shorter than that of thicker film. The activity of CB (activated carbon) and HALS, both taken separately, also seems to depend on the thickness. Especially in the 25 μm film the activity of CB is inferior. The synergistic effect of the combination of CB+HALS is surprisingly great.

At a film thickness of 100 μm the life is found to increase almost tenfold compared to the sum of the separate effects of HALS and CB.

Experiment 16

In a further experiment a 50 μm film of Arnitel® PM 380*) with 1% HALS and 1% CB was tested for its ageing properties under the same conditions as in the preceding experiments. After 1000 hours an elongation at break of 300% is still measured. This again proves the stability of the composition according to the invention.

*)Arnitel® PM 380: a polyetherester copolymer with ethylene oxide-capped polypropylene oxide as soft segment. Shore D=38, from DSM, The Netherlands.

Experiments 17–24

Some Arnitel® EM 400 films (100 μm) containing different combinations of UV stabilizers were subjected to ageing tests. The test conditions differed from those of the preceding tests. The intensity was 0.28 W/m²/nm at 340 nm and the black panel temperature 50° C. As a measure of the life again the time was used after which the elongation at break has decreased to less than 100%.

TABLE 2

| Experiment | 17 | 18 | 19 | 20 | 21 | 22 | 23 | 24* |
|---|---|---|---|---|---|---|---|---|
| HALS Tin 144 | 0.5 | | 0.25 | 0.50 | 0.0 | | | 0.5 |
| UV stab Tin 234 | | 0.5 | 0.25 | 0.50 | 0.0 | | | |
| CB | | | | | 0.0 | 0.4 | 1.0 | 1.0 |
| life [hours] | 125 | 400 | 280 | 600 | 48 | 80 | 250 | 1500 |

Tin 144=Tinuvin® 144, M=665
Tin 234=Tinuvin® 234, a UV absorber, 2(2-hydroxy-3,5 di(1,1-dimethyl benzyl/phenyl)-2H-benzotriazol
N. B. In the composition without CB the presence of an antioxidant was necessary; in this case this was 0.25 wt. % Irganox®
1010, a phenolic antioxidant from Ciba.

This experiment again proves the highly reinforcing effect of activated carbon and the HALS stabilizer. An added advantage of the combination according to the invention, experiment 24, is that no antioxidant needs to be added.

What is claimed is:

1. Polyetherester copolymer composition containing UV light stabilizer system consisting of 0.1–10 wt. % activated carbon and 0.05–3 wt. % of a hindered amine light stabilizer.

2. Polyester copolymer composition according to claim 1, wherein the UV light stabilizer system contains 0.5–5 wt. % activated carbon and 0.1–2 wt. % of said UV stabilizer.

3. Polyetherester copolymer composition according to claim 1 wherein the ratio between hard and soft segments in the copolyetherester results in a Shore D hardness of 25–80.

4. Polyetherester copolymer composition according to claim 1 wherein the C:O ratio in the polyalkylene oxide glycol, from which the polyetherester copolymer is derived, is between 2 and 4.3.

5. Polyetherester copolymer composition according to claim 1 wherein the average primary particle size in the carbon dispersion in the composition is 15–40 nm.

6. Polyetherester copolymer composition according to claim 1, wherein the hindered amine light stabilizer has a molecular weight higher than 1500.

7. Polyetherester copolymer composition according to claim 6, wherein the hindered amine stabilizer is (i) oligomer of N-(2-hydroxyethyl)-2,2,6,6-tetramethyl)-4-piperidinol and succinic acid, (ii) polymethylpropyl-3-oxy-[4(2,2,6,6 tetramnethyl)-piperidinyl]-siloxane, (iii) poly((6-morpholine-S-triazine-2,4-diyl)(2,2,6,6-tetramethyl-4-piperidinyl)-iminohexamethylene-(2,2,6,6-tetramethyl-4-piperidinyl)-imino, or (iv) oligomer of cyanuric acid and N,N-di(2,2,6,6-tetramethyl-4-piperidyl)-hexamethylene diamine.

8. Film obtained from a composition according to claim 1.

9. Film obtained from a polyetherester copolymer composition that contains 0.5–3 wt. % activated carbon and 0.1–2 wt. % HALS, that has a Shore hardness of 25–80, and of which the C:O ratio in the polyalkylene oxide glycol, from which the polyether ester is derived, is between 2 and 4.3, the average particle size in the carbon dispersion in the composition is 15–40 nm and the HALS has a molecular weight higher than 2000.

10. Polyester copolymer composition according to claim 1, wherein the composition contains 0.5–3 wt. % activated carbon and 0.2–1 wt. % of said UV stabilizer.

11. Polyetherester copolymer composition according to claim 1, wherein the hindered amine light stabilizer has a molecular weight higher than 2000.

12. A method for providing moisture regulation to a building material, comprising providing on the building material a moisture regulating top layer comprising a film according to claim 8, whereby said building material will be resistant to deterioration of mechanical properties even after being exposed to direct sunlight.

13. A method for providing moisture regulation to a building material comprising providing on the building material a moisture regulating top layer comprising a film according to claim 9, whereby said building material will be resistant to deterioration of mechanical properties even after being exposed to direct sunlight.

14. A roof covering material comprising a moisture regulating top layer comprising a film according to claim 8.

15. A roof covering material having a moisture regulating top layer comprising a film according to claim 9.

* * * * *

UNITED STATES PATENT AND TRADEMARK OFFICE
CERTIFICATE OF CORRECTION

PATENT NO. : 6,534,585 B1
DATED : March 18, 2003
INVENTOR(S) : Dijkstra et al.

It is certified that error appears in the above-identified patent and that said Letters Patent is hereby corrected as shown below:

<u>Title page,</u>
Item [30], Foreign Application Priority Data, please correct to read as follows:
-- May 29, 1998 (NL) .......................................... 1009288 --.

Signed and Sealed this

Twenty-ninth Day of July, 2003

JAMES E. ROGAN
*Director of the United States Patent and Trademark Office*